US008438394B2

(12) United States Patent
Etchegoyen et al.

(10) Patent No.: US 8,438,394 B2
(45) Date of Patent: May 7, 2013

(54) DEVICE-BOUND CERTIFICATE AUTHENTICATION (75) Inventors: Craig S. Etchegoyen, Newport Beach, CA (US); Dono Harjanto, Irvine, CA (US)

(73) Assignee: NetAuthority, Inc., San Francisco, CA (US)

( * ) Notice: Subject to any disclaimer, the term of this patent is extended or adjusted under 35 U.S.C. 154(b) by 0 days.

(21) Appl. No.: 13/179,387

(22) Filed: Jul. 8, 2011

(65) Prior Publication Data

US 2012/0204033 A1   Aug. 9, 2012

Related U.S. Application Data (60) Provisional application No. 61/433,048, filed on Jan. 14, 2011.

(30) Foreign Application Priority Data

Feb. 9, 2011   (AU) .................................. 2011100168

(51) Int. Cl.
H04L 29/06   (2006.01)
(52) U.S. Cl.
USPC .................................. 713/175; 726/2; 726/10
(58) Field of Classification Search .................. 713/175; 726/2, 10
See application file for complete search history.

(56) References Cited

U.S. PATENT DOCUMENTS

| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |
| 5,239,166 A | 8/1993 | Graves |
| 5,260,999 A | 11/1993 | Wyman |
| 5,291,598 A | 3/1994 | Grundy |
| 5,414,269 A | 5/1995 | Takahashi |
| 5,418,854 A | 5/1995 | Kaufman et al. |
| 5,440,635 A | 8/1995 | Bellovin et al. |

(Continued)

FOREIGN PATENT DOCUMENTS

| AU | 678985 | 6/1997 |
| EP | 1 637 958 | 3/2006 |

(Continued)

OTHER PUBLICATIONS

Housley et al., "Internet x.509 Public Key Infracstructure Certificate and CRL Profile," The Internet Society, Network Working Group, 1999, 75 pages. [RFC 2459].

(Continued)

*Primary Examiner* — Hadi Armouche
*Assistant Examiner* — Lisa Lewis
(74) *Attorney, Agent, or Firm* — Sean D. Burdick (57) ABSTRACT A device-bound certificate authority binds a certificate to one or more devices by including digital fingerprints of the devices in the certificate. A device only uses a device-bound certificate if the digital fingerprint of the device is included in the certificate and is verified. Thus, a certificate is only usable by one or more devices to which the certificate is explicitly bound. Such device-bound certificates can be used for various purposes served by certificates generally such as device driver authentication and authorization of access to secure content, for example.

6 Claims, 8 Drawing Sheets

U.S. PATENT DOCUMENTS

| | | |
|---|---|---|
| 5,490,216 A | 2/1996 | Richardson, III |
| 5,666,415 A | 9/1997 | Kaufman |
| 5,745,879 A | 4/1998 | Wyman |
| 5,754,763 A | 5/1998 | Bereiter |
| 5,790,664 A | 8/1998 | Coley et al. |
| 5,925,127 A | 7/1999 | Ahmad |
| 5,974,150 A | 10/1999 | Kaish et al. |
| 6,009,401 A | 12/1999 | Horstmann |
| 6,029,141 A | 2/2000 | Bezos et al. |
| 6,044,471 A | 3/2000 | Colvin |
| 6,158,005 A | 12/2000 | Bharathan et al. |
| 6,230,199 B1 | 5/2001 | Revashetti et al. |
| 6,233,567 B1 | 5/2001 | Cohen |
| 6,243,468 B1 | 6/2001 | Pearce et al. |
| 6,294,793 B1 | 9/2001 | Brunfeld et al. |
| 6,330,670 B1 | 12/2001 | England et al. |
| 6,449,645 B1 | 9/2002 | Nash |
| 6,536,005 B1 | 3/2003 | Augarten |
| 6,785,825 B2 | 8/2004 | Colvin |
| 6,826,690 B1 | 11/2004 | Hind et al. |
| 6,859,793 B1 | 2/2005 | Lambiase |
| 6,920,567 B1 | 7/2005 | Doherty et al. |
| 6,976,009 B2 | 12/2005 | Tadayon et al. |
| 7,032,110 B1 | 4/2006 | Su et al. |
| 7,069,440 B2 | 6/2006 | Aull |
| 7,069,595 B2 | 6/2006 | Cogmigni et al. |
| 7,085,741 B2 | 8/2006 | Lao et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,272,728 B2 | 9/2007 | Pierson et al. |
| 7,305,562 B1 | 12/2007 | Bianco et al. |
| 7,319,987 B1 | 1/2008 | Hoffman et al. |
| 7,327,280 B2 | 2/2008 | Bachelder et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,653,899 B1 | 1/2010 | Lindahl et al. |
| 7,836,121 B2 | 11/2010 | Elgressy et al. |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0082997 A1 | 6/2002 | Kobata et al. |
| 2002/0091937 A1 | 7/2002 | Ortiz |
| 2002/0161718 A1 | 10/2002 | Coley et al. |
| 2003/0065918 A1 | 4/2003 | Wiley |
| 2003/0116621 A1* | 6/2003 | Duncan ............ 235/379 |
| 2003/0172035 A1 | 9/2003 | Cronce et al. |
| 2004/0024860 A1 | 2/2004 | Sato et al. |
| 2004/0030912 A1 | 2/2004 | Merkle et al. |
| 2004/0059929 A1 | 3/2004 | Rodgers et al. |
| 2004/0059938 A1 | 3/2004 | Hughes et al. |
| 2004/0107360 A1 | 6/2004 | Herrmann et al. |
| 2004/0117321 A1 | 6/2004 | Sancho |
| 2004/0143746 A1 | 7/2004 | Ligeti et al. |
| 2004/0172558 A1 | 9/2004 | Callahan et al. |
| 2004/0187018 A1 | 9/2004 | Owen et al. |
| 2005/0033833 A1* | 2/2005 | Baldiga et al. ........ 709/222 |
| 2005/0034115 A1 | 2/2005 | Carter et al. |
| 2005/0108173 A1 | 5/2005 | Stefik et al. |
| 2005/0138155 A1 | 6/2005 | Lewis |
| 2005/0166263 A1 | 7/2005 | Nanopoulos et al. |
| 2005/0172280 A1 | 8/2005 | Ziegler et al. |
| 2005/0268087 A1 | 12/2005 | Yasuda et al. |
| 2006/0072444 A1 | 4/2006 | Engle et al. |
| 2006/0080534 A1* | 4/2006 | Yeap et al. ............ 713/176 |
| 2006/0095454 A1 | 5/2006 | Shankar et al. |
| 2006/0161914 A1 | 7/2006 | Morrison et al. |
| 2006/0265337 A1 | 11/2006 | Wesinger, Jr. |
| 2006/0265446 A1 | 11/2006 | Elgressy et al. |
| 2006/0282511 A1 | 12/2006 | Takano et al. |
| 2007/0061566 A1* | 3/2007 | Bailey et al. ............ 713/151 |
| 2007/0168288 A1 | 7/2007 | Bozeman |
| 2007/0174633 A1 | 7/2007 | Draper et al. |
| 2007/0198422 A1 | 8/2007 | Prahlad et al. |
| 2007/0203846 A1 | 8/2007 | Kavuri et al. |
| 2007/0209064 A1 | 9/2007 | Qin et al. |
| 2007/0219917 A1 | 9/2007 | Liu et al. |
| 2007/0282615 A1 | 12/2007 | Hamilton et al. |
| 2008/0052775 A1 | 2/2008 | Sandhu et al. |
| 2008/0065552 A1 | 3/2008 | Elezar et al. |
| 2008/0086423 A1 | 4/2008 | Waites |
| 2008/0120195 A1 | 5/2008 | Shakkarwar |
| 2008/0147556 A1 | 6/2008 | Smith et al. |
| 2008/0228578 A1 | 9/2008 | Mashinsky |
| 2008/0268815 A1 | 10/2008 | Jazra et al. |
| 2008/0320607 A1 | 12/2008 | Richardson |
| 2009/0003600 A1* | 1/2009 | Chen et al. ............ 380/217 |
| 2009/0083730 A1 | 3/2009 | Richardson |
| 2009/0113088 A1 | 4/2009 | Illowsky et al. |
| 2009/0132813 A1 | 5/2009 | Schibuk |
| 2009/0138975 A1 | 5/2009 | Richardson |
| 2009/0150674 A1 | 6/2009 | Richardson et al. |

FOREIGN PATENT DOCUMENTS

| | | |
|---|---|---|
| EP | 1 637 961 | 3/2006 |
| EP | 1 670 188 | 6/2006 |
| GB | 2355322 | 4/2001 |
| WO | WO 92/09160 | 5/1992 |
| WO | WO 92/20022 | 11/1992 |
| WO | WO 93/01550 | 1/1993 |
| WO | WO 95/35533 | 12/1995 |
| WO | WO 00/58895 | 10/2000 |
| WO | WO 00/67095 | 11/2000 |
| WO | WO 01/90892 | 11/2001 |
| WO | WO 2005/104686 | 11/2005 |
| WO | WO 2007/060516 | 5/2007 |
| WO | WO 2008/013504 | 1/2008 |
| WO | WO 2008/127431 | 10/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |

OTHER PUBLICATIONS

"Technical Details on Microsoft Product Activation for Windows XP," Internet Citation, XP002398930, Aug. 13, 2001.

"How Microsoft Product Activation (WPA) Works in Windows XP and Windows Vista," *PCBUYERBEWARE*, retrieved from the Internet on May 10, 2008. XP002613942.

Angha et al.; "Securing Transportation Network Infrastructure with Patented Technology of Device Locking—Developed by Uniloc USA", http://www.dkassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Johnson et al. "Dimensions of Online Behavior: Toward a User Typology," *Cyberpsycology and Behavior*, vol. 10, No. 6, pp. 773-779, 2007. XP002617349.

Klein, M., "How to Use a Loyalty Analysis," *Loyalty Builders*, pp. 1-6, 2003. XP002617371.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

Wikipedia: "Device Fingerprint," May 5, 2009 and modified on Jan. 20, 2011, Internet Article retrieved on Apr. 19, 2011.

Williams et al., "Web Database Applications with PHP & MySQL," *O'Reilly Media Chapter 1. Database Applications and the Web* Mar. 2002, Internet Article retrieved on Sep. 21, 2010. XP002603488.

Williams, R., "A Painless Guide to CRC Error Detection Algorithms," Aug. 13, 1993, 33 pages, www.ross.net/crc/download/crc_v3.txt.

Wikipedia: "Software Extension," May 28, 2009, Internet Article retrieved on Oct. 11, 2010. XP002604710.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Jensen et al., "Assigning and Enforcing Security Policies on Handheld Devices," 2002, 8 pages.

Johnson et al. "Dynamic Source Routing in Ad Hoc Wireless Networks," *Mobile Computing*, Kluwer Academic Publishers, 1996.

\* cited by examiner

DEVICE-BOUND CERTIFICATE AUTHENTICATION

This application claims priority to U.S. Provisional Application 61/433,048, which was filed on Jan. 14, 2011.

BACKGROUND OF THE INVENTION

1. Field of the Invention

The present invention relates generally to computer security and, more particularly, methods of and systems for securely authenticating devices.

2. Description of the Related Art

Digital certificates are used in cryptographic systems, particularly those using PKI (Public Key Infrastructure), to authenticate data in various contexts. For example, device drivers often require authentication using a certificate of the source of the particular driven device before a computer will permit installation of the device driver to ensure that the device will behave properly. In addition, certificates can be used to identify computers as authorized to access secure content.

One of the shortcomings of certificates today is that copies of certificates can be kept in many storage locations, making copying and improper use of a certificate a significant risk to security.

SUMMARY OF THE INVENTION

In the first aspect, the present invention accordingly provides a method for binding a digital certificate that can be stored on a computer-readable medium to one or more devices, the method comprising: receiving at a server computer a request from a remote device through a computer network wherein the request identifies the certificate and identifies each one of the one or more devices by a device identifier created by the server computer, each device identifier being uniquely associated with a digital fingerprint of one of the devices; retrieving the certificate; for each of the one or more devices: retrieving the digital fingerprints of the device; and including the digital fingerprint in the certificate; and sending the certificate with the one or more included digital fingerprints to the remote device through the computer network.

In another form, remote device determines whether the digital fingerprint that is included in the certificate corresponds to the remote device and, upon a condition in which the digital fingerprint corresponds to the remote device, accepts the certificate as legitimate.

In another form, the server computer in response to the request serves a device driver cryptographically signed with the certificate so that any of the devices can install the device driver only upon a condition in which one of the digital fingerprints corresponds to the installing device.

In another form, the remote device determines whether the digital fingerprint that is included in the certificate corresponds to a requesting device from which the remote device has received a request for access to secure content of the remote device and, upon a condition in which the digital fingerprint corresponds to the requesting device and the remote device is preconfigured to recognize the requesting device as authorized to access the secure content, grant the request.

In a second aspect, the present invention accordingly provides a computer readable medium useful in association with a computer which includes one or more processors and a memory, the computer readable medium including computer instruction which are configured to cause the computer, by execution of the computer instructions in the one or more processors from the memory, to bind a digital certificate that can be stored on a computer-readable medium to one or more devices by at least: receiving at the computer a request from a remote device through a computer network wherein the request identifies the certificate and identifies each of the one or more devices by a device identifier created by the computer, each device identifier being uniquely associated with a digital fingerprint of one of the devices; retrieving the certificate; for each of the one or more devices: retrieving the digital fingerprints of the device; and including the digital fingerprint in the certificate; and sending the certificate with one or more included digital fingerprints to the remote device through the computer network.

In accordance with the present invention, a device-bound certificate authority binds a certificate to one or more devices by including digital fingerprints of the devices in the certificate. A device only uses a device-bound certificate if the digital fingerprint of the device is included in the certificate and is verified. Thus, a certificate is only usable by one or more devices to which the certificate is explicitly bound.

Such device-bound certificates can be used for various purposes served by certificates generally such as device driver authentication and authorization of access to secure content, for example.

Should a certificate have its security compromised, the effect of such compromise is limited to just those explicitly authorized devices to which the certificate is bound. The certificate cannot be used by unauthorized devices to which the certificate might be distributed. As a result, any malicious programming injected into code authenticated by a compromised certificate that is distributed by some entity other than a duly authorized device-bound certificate authority will not be executed by devices that require device bound certificates.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
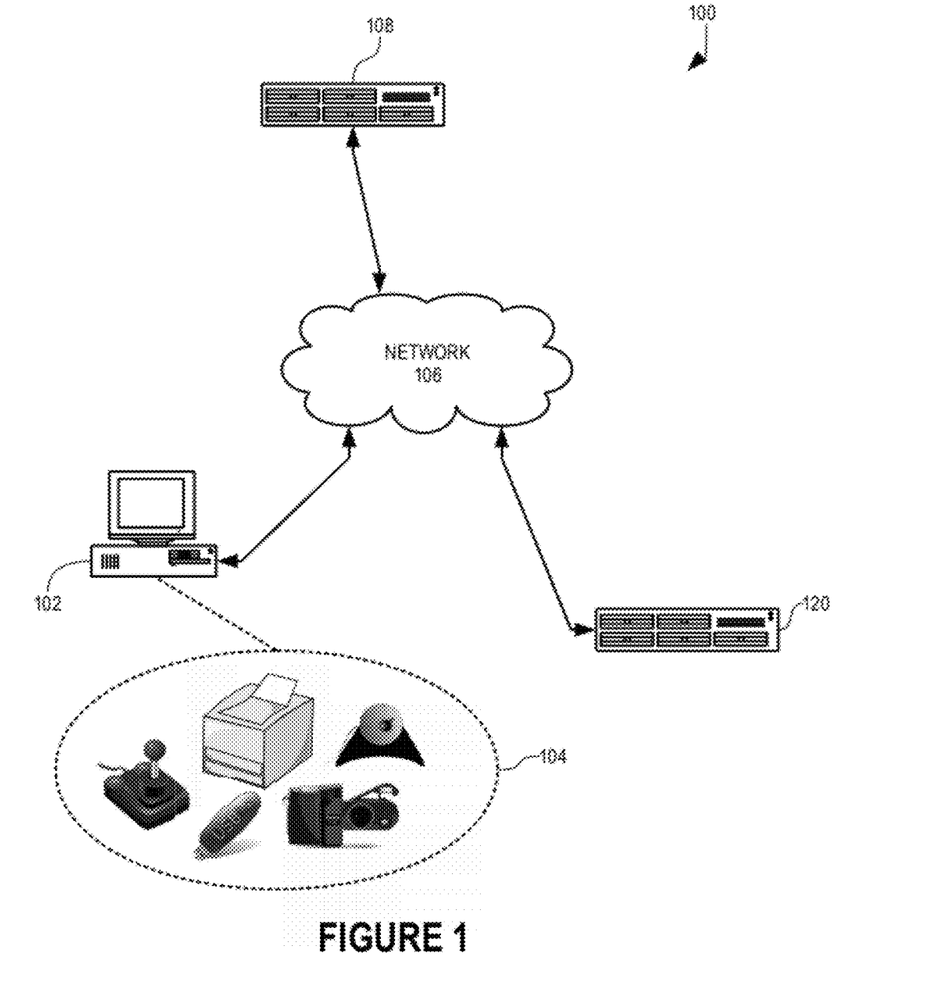
FIG. 1 is a diagram showing a client computer and a device-bound certificate authority that manage device-bound certificates in accordance with one embodiment of the present invention.

In accordance with the present invention, digital certificates 802 (FIG. 8) are bound to specific devices and are therefore each usable by one or more explicitly authorized devices, e.g., client computer 102 (FIG. 1). A digital certificate copied from client computer 102 cannot be used on another device unless that other device is explicitly authorized within the digital certificate. Such forces the other device to obtain certificates only from an authorized device-bound certificate authority 108.

In this illustrative embodiment, device-bound certificate authority 108 binds certificate 802 (FIG. 8) to client computer 102 by including authorized device data 804 in certificate 802. Authorized device data 804 uniquely identifies at least one authorized device from all other devices to which device-bound certificate authority can serve certificates and identifies client computer 102 by a digital fingerprint of client computer 102, for example. Digital fingerprints are known and are described, e.g., in U.S. Pat. No. 5,490,216 (sometimes referred to herein as the '216 Patent) and that description is incorporated herein by reference. In this illustrative embodiment, certificate 802 is an X.509 certificate based on RFC-2459.

Figure 8:
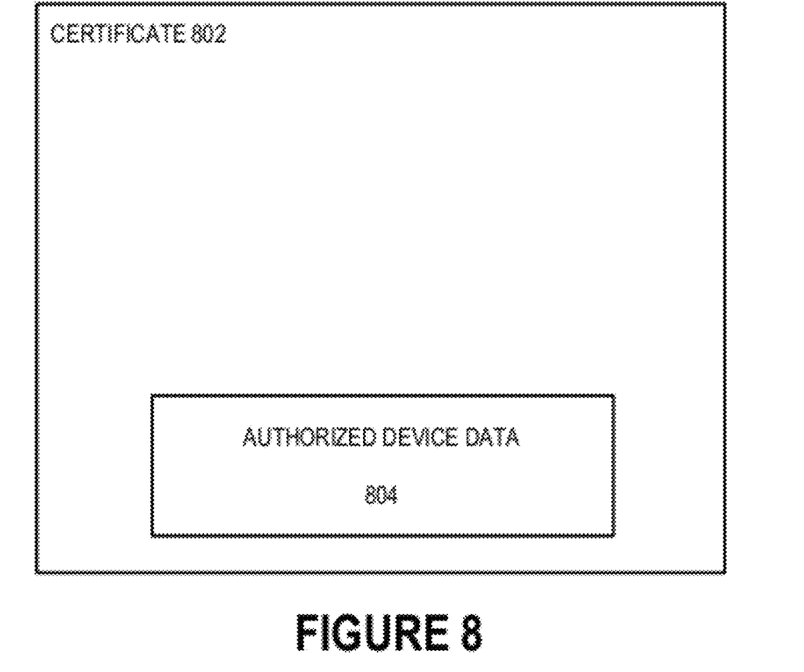
FIG. 8 is a block diagram illustrating one embodiment of a device-bound certificate in accordance with the present invention.

Prior to using certificate 802, client computer 102 always verifies that authorized device data 804 indicates that client computer 102 is authorized to use certificate 802. As described more completely below, such indicates that client computer 102 received certificate 802 from a device-bound certificate authority that client computer 102 trusts and with which client computer 102 has registered.

Before describing the management and use of device-bound certificates in accordance with the present invention, some elements of client computer 102 (FIG. 1) and device-bound certificate authority 108 are briefly described.

Figure 3:
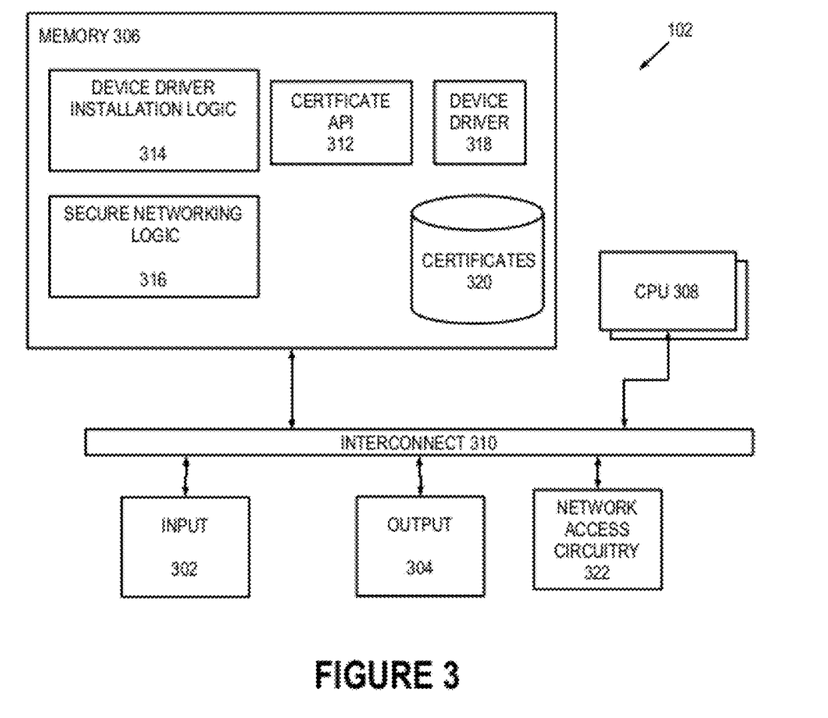
FIG. 3 is a block diagram showing the client computer of FIG. 1 in greater detail.

Client computer 102 is shown in greater detail in FIG. 3 and includes one or more microprocessors 308 (collectively referred to as CPU 308) that retrieve data and/or instructions from memory 306 and execute retrieved instructions in a conventional manner. Memory 306 can include generally any computer-readable medium including, for example, persistent memory such as magnetic and/or optical disks, ROM, and PROM and volatile memory such as RAM.

CPU 308 and memory 306 are connected to one another through a conventional interconnect 310, which is a bus in this illustrative embodiment and which connects CPU 308 and memory 306 to one or more input devices 302, output devices 304, and network access circuitry 322. Input devices 302 can include, for example, a keyboard, a keypad, a touch-sensitive screen, a mouse, and a microphone. Output devices 304 can include, for example, a display—such as a liquid crystal display (LCD)—and one or more loudspeakers. Network access circuitry 322 sends and receives data through a wide area network 106 (FIG. 1) such as the Internet and/or mobile device data networks.

A number of components of client computer 102 are stored in memory 306. In particular, certificate API 312, device driver installation logic 314, and secure networking logic 316 are each all or part of one or more computer processes executing within CPU 308 from memory 306 in this illustrative embodiment but can also be implemented using digital logic circuitry. As used herein, "logic" refers to (i) logic implemented as computer instructions and/or data within one or more computer processes and/or (ii) logic implemented in electronic circuitry. Certificates 320 are data stored persistently in memory 306. In this illustrative embodiment, certificates 320 are organized as a database.

Figure 4:
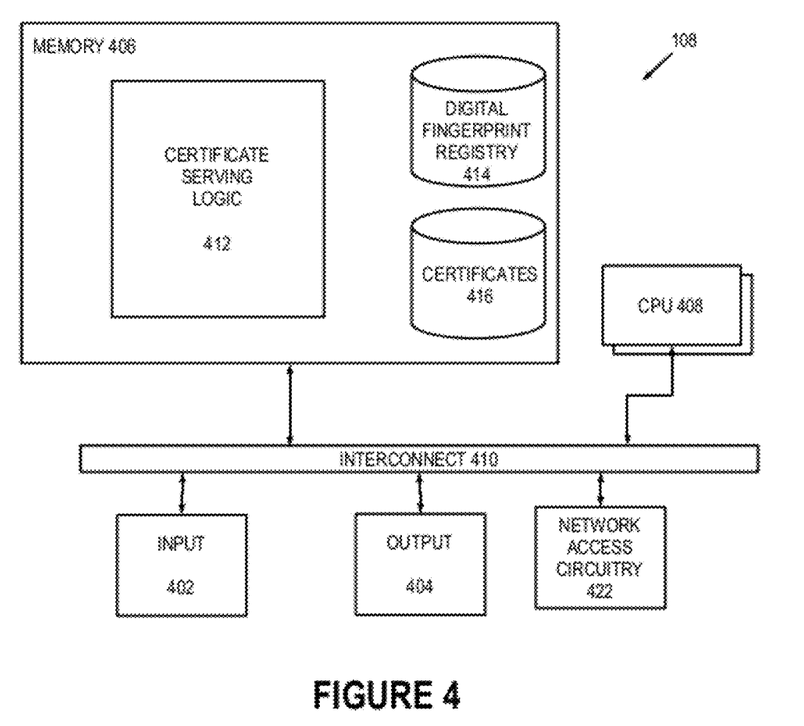
FIG. 4 is a block diagram showing the device-bound certificate authority of FIG. 1 in greater detail.

Device-bound certificate authority 108 (FIG. 1)—which is sometimes referred to herein as DBCA 108—is shown in greater detail in FIG. 4 and includes a CPU 408, memory 406, interconnect 410, input devices 402, output devices 404, and network access circuitry 422 that are directly analogous to CPU 308 (FIG. 3), memory 306, interconnect 310, input devices 302, output devices 304, and network access circuitry 322, respectively, of client computer 102. Since DBCA 108 (FIG. 4) is a server computer, input devices 402 and output devices 404 can be omitted and DBCA 108 can interact with one or more human users exclusively through network access circuitry 422, e.g., through a remote command shell protocol such as the known 'ssh' remote command shell protocol.

A number of components of DBCA 108 are stored in memory 406. In particular, certificate serving logic 412 is all or part of one or more computer processes executing within CPU 408 from memory 406 in this illustrative embodiment but can also be implemented using digital logic circuitry. Digital fingerprint registry 414 and certificates 416 are data stored persistently in memory 406. In this illustrative embodiment, digital fingerprint registry 414 and certificates 416 are each organized as a database.

In one embodiment, DBCA 108 also serves as a conventional certificate authority and maintains certificates 416 in a conventional manner in addition to the device-bound certificate management described herein. In an alternative embodiment, DBCA 108 uses a remotely-located certificate authority to obtain authentic copies of certificates in a conventional manner and maintains certificates 416 for local device binding in the manner described herein. DBCA 108 can also maintain certificates 416 for limited periods of time as a cache of device-bound certificates to more efficiently serve repeated requests for the same device-bound certificates in a relatively short amount of time.

Figure 9:
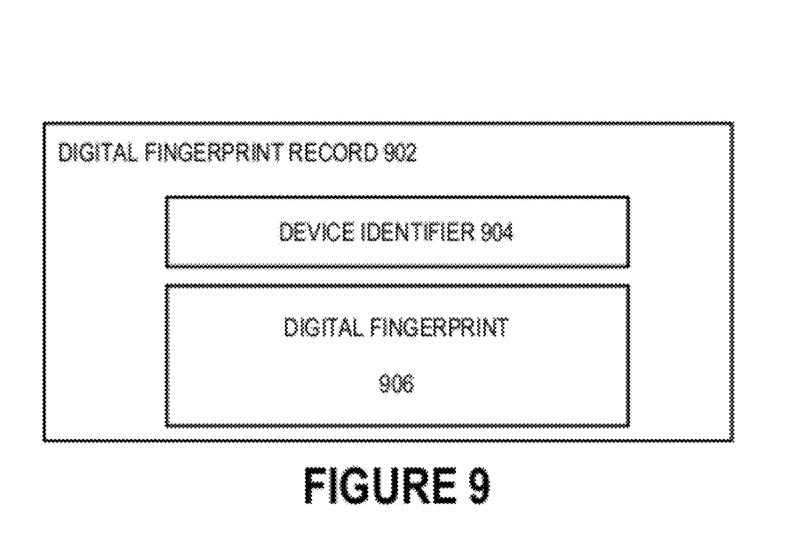
FIG. 9 is a block diagram illustrating one example of a digital fingerprint record of a digital fingerprint registry of the device-bound certificate authority of FIG. 4.

Digital fingerprint registry 414 stores a number of digital fingerprint records such as digital fingerprint record 902 (FIG. 9). Digital fingerprint record 902 includes a device identifier 904 and a digital fingerprint 906 and therefore represents an association between a device identifier and a digital fingerprint. DBCA 108 ensures that device identifier 904 is unique among all device identifiers stored in digital fingerprint registry 414.

Prior to use of DBCA 108, a device must register with DBCA 108. For example, client computer 102 (FIG. 1) sends a registration request to DBCA 108 that includes a digital fingerprint of client computer 102. In response to the request, DBCA 108 (i) creates a unique identifier for client computer 102, (ii) stores the identifier as device identifier 904 in a new digital fingerprint record 902 that also includes the digital fingerprint received from client computer 102 as digital fingerprint 906, and (iii) returns the identifier to client computer 102 as part of a report of successful registration with DBCA 108.

In an alternative embodiment, DBCA 108 directs a device to produce a digital fingerprint of itself when DBCA 108 does not already have a digital fingerprint of the device. In other words, DBCA 108 can implement dynamic registration. In particular, upon determining that DBCA 108 requires a digital fingerprint of a given device and does not have one, DBCA 108 requests that the device send DBCA 108 a digital fingerprint of the device. In response to such a request, client computer 102 generates a digital fingerprint of itself and sends the digital certificate to DBCA 108.

In some embodiments, client computer 102 creates the digital fingerprint of itself using logic in certificate API 312 (FIG. 3). In other embodiments, DBCA 108 directs client computer 102 to obtain digital fingerprint generation logic and to then execute the logic to thereby generate a digital fingerprint of client computer 102. The particular manner in which DBCA 108 specifies the logic to be obtained by client computer 102 and the particular manner in which client computer 102 executes the logic are unimportant and there are many known ways for accomplishing each.

For example, DBCA 108 can provide the logic directly or can provide a URL to the logic so as to direct client computer 102 to access the logic using the URL. The URL can identify logic to be obtained from DBCA 108 directly or can identify other computers reachable through wide area network 106. In addition, client computer 102 can execute the logic by receiving and installing the logic as client computer 102 would install software generally or client computer 102 can execute the logic as active content in a web page displayed by a browser of client computer 102.

Figure 2:
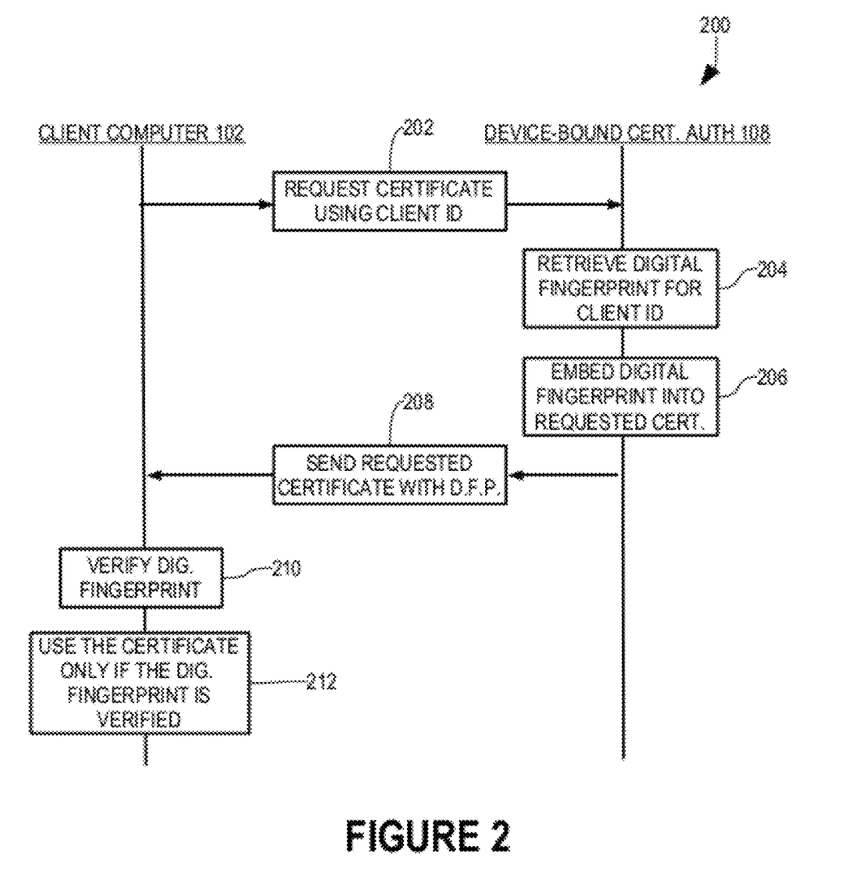
FIG. 2 is a transaction diagram illustrating one method of serving a device-bound certificate by the device-bound certificate authority of FIG. 1 to the client computer of FIG. 1.

Subsequently to registration with DBCA 108 as described above or in conjunction with dynamic registration as described above, client computer 102 can retrieve device-bound certificates from DBCA 108 in a manner illustrated in transaction flow diagram 200 (FIG. 2). In step 202, client computer 102 requests a certificate from DBCA 108. The request of step 202 includes both identification of the entity whose certificate is needed and the identifier 904 of client computer 102 previously received from DBCA 108. The request of step 202 can also include identifiers of other devices if client computer 102 is configured to request a certificate that is also bound to one or more other devices.

In step 204, DBCA 108 retrieves the certificate of the entity whose certificate is requested in step 202. DBCA 108 retrieves the certificate from certificates 416 (FIG. 4) in this illustrative embodiment. In other embodiments, DBCA 108 retrieves the certificate from a certificate authority through wide area network 106. If the certificate is retrieved from a remotely-located certificate authority through wide area network 106, DBCA 108 can store retrieved certificates in certificates 416 as a cache.

In step 206, DBCA 108 retrieves the digital fingerprint of client computer 102 using the identifier of the request. The retrieved digital fingerprint is the one associated with the received identifier in digital fingerprint registry 414 (FIG. 4). DBCA 108 retrieves the digital fingerprint from digital fingerprint registry 414 in this illustrative embodiment. In other embodiments, DBCA 108 retrieves the digital fingerprint from another computer through wide area network 106. If the digital fingerprint is retrieved from a remotely-located computer through wide area network 106, DBCA 108 can store retrieved digital fingerprint in digital fingerprint registry 414 as a cache.

In step 206 (FIG. 2), DBCA 108 embeds the retrieved digital fingerprint, e.g., digital fingerprint 906 (FIG. 9) into the requested certificate, e.g., certificate 802 (FIG. 8). In this illustrative embodiment, authorized device data 804 includes only one digital fingerprint and is therefore bound to only a single device. In alternative embodiments, authorized device data 804 can include multiple digital fingerprints and can limit the number of digital fingerprints to a predetermined maximum. Thus, a single certificate can be bound to a limited number of devices. DBCA 108 cryptographically signs certificate 802 to make certificate 802 tamper-evident.

In step 208 (FIG. 2), DBCA 108 sends certificate 802 (FIG. 8) with authorized device data 804 that includes digital fingerprint 906 (FIG. 6) of client computer 102 (FIG. 1).

In step 210 (FIG. 2), client computer 102 verifies the digital fingerprint of authorized device data 804 by comparing each of the embedded digital fingerprints to the digital fingerprint of client computer 210. Verification of digital fingerprints is described in the '216 Patent and that description is incorporated herein by reference.

In step 212, client computer 102 accepts and uses certificate 802 only if at least one digital fingerprint of authorized device data 804 matches the digital fingerprint of client computer 102. Conversely, if no digital fingerprint of authorized device data 804 matches the digital fingerprint of client computer 102, client computer 102 rejects certificate 802 and refuses to perform any tasks that require certificate 802. In another embodiment, client computer 102 may reject certificate 802 if it detects more than one match of the digital fingerprint.

Figure 5:
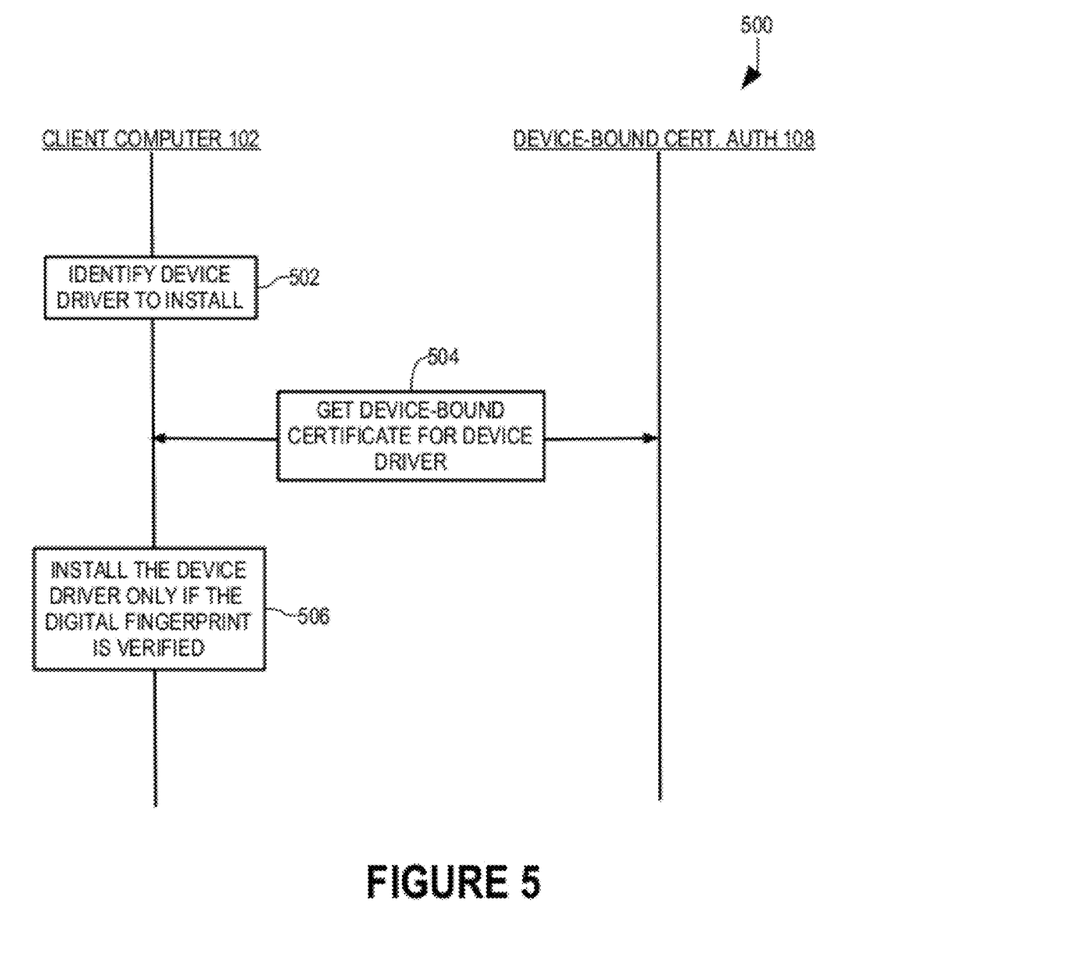
FIG. 5 is a transaction diagram illustrating one embodiment according to the invention of a method of using a device-bound certificate by the client computer of FIG. 1 to authenticate a device driver for installation.

An example of such a task is the installation of a cryptographically signed device driver and is illustrated in transaction diagram 500 (FIG. 5). In this illustrative example, a user of client computer 102 has requested installation of a device driver 318 (FIG. 3), either implicitly by physically connecting one of peripheral devices 104 (FIG. 1) to client computer 102 or explicitly by physical manipulation of one or more of user input devices 302 (FIG. 3) using conventional user-interface techniques.

Device drivers are known and are only described briefly to facilitate appreciation and understanding of the present invention. Various peripheral devices 104 (FIG. 1), such as printers, scanners, game controllers, storage devices, and digital cameras, are designed to interact with logic of client computer 102. However, most, if not all, of the logic of client computer 102 is designed without awareness of the specific interfaces of many such peripheral devices. Device driver 318 (FIG. 3) provides such awareness and serves as a bridge over the gap in logic between the specific interface of a peripheral device and other logic of client computer 102.

Many device drivers are cryptographically signed by the manufacturer/supplier of the driven peripheral device. Such is intended to prevent tampering with the device driver as such tampering can enable injection of malicious behavior. If the security provided by a conventional certificate is compromised, the compromised security affects all devices that can rely on the compromised certificate. However, certificates that are bound to one or more devices can only be relied upon by that device or those devices, significantly limiting the harm that can be caused by compromised security of such certificates.

In step 502 (FIG. 5), client computer 102 identifies device driver 318 (FIG. 3) as the device driver to be installed. In this illustrative example, device driver 318 is cryptographically signed and client computer 102 gets a device-bound certificate for the signor from DBCA 108 in step 504 (FIG. 5). Transaction diagram 200 (FIG. 2) illustrates the processing of step 504 (FIG. 5).

In step 506, client computer 102 installs device driver 318 (FIG. 3) only if (i) the certificate received in step 504 is verified to be bound to client computer 102 and (ii) the cryptographic signature of device driver 318 is verified with the certificate received in step 504. If the certificate should ever be compromised, e.g., by a malicious user with access to client computer 102, the compromise is limited to client computer 102 and other devices that might be bound to the certificate by authorized device data 804 (FIG. 8). If authorized device data 804 is modified, the modification causes verification of the cryptographic signature of DBCA 108 to fail.

Figure 6:
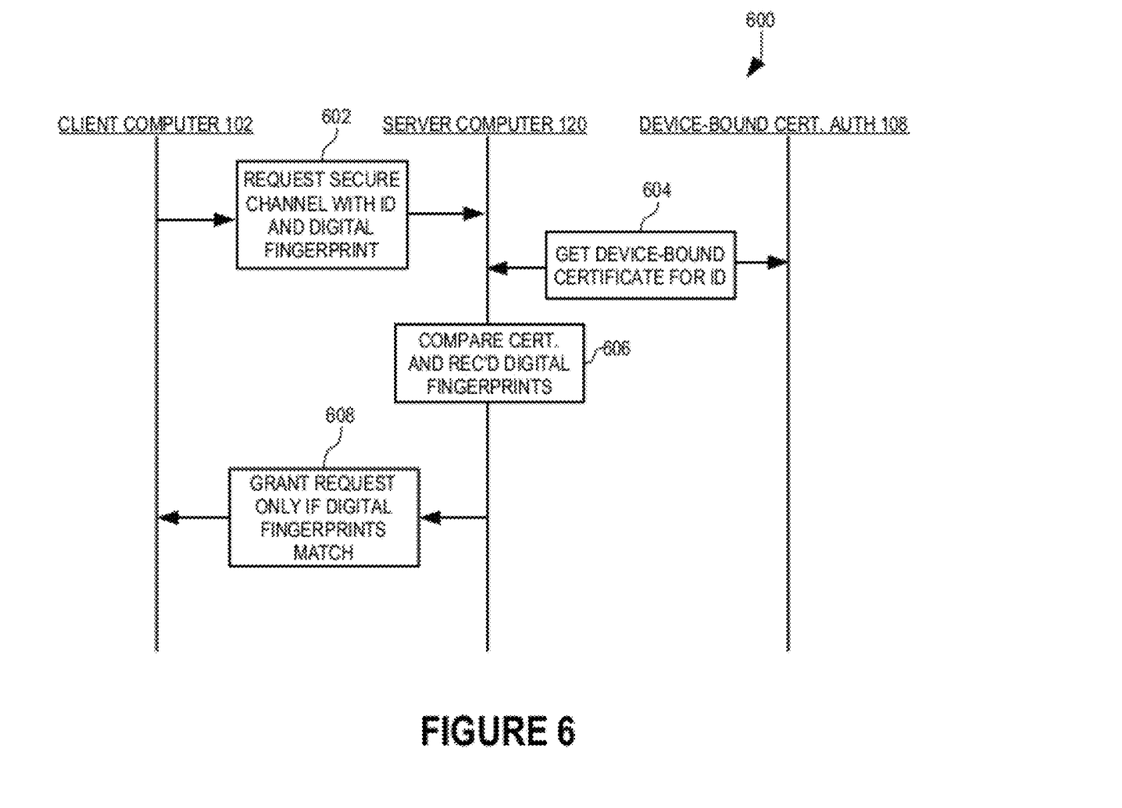
FIG. 6 is a transaction diagram illustrating one embodiment of a method of using a device-bound certificate by a server of FIG. 1 to authenticate the client computer of FIG. 1 for establishing a secure connection therewith.

Another example of a task that is made more secure by device-bound certificates is the establishment of access to secure content and is illustrated in transaction flow diagram 600 (FIG. 6).

In this illustrative example of the establishment of access to secure content as shown in transaction flow diagram 600, client computer 102 requests access to secure content within a server computer 120 (FIG. 1). Server computer 120 is shown in greater detail in FIG. 7.

Figure 7:
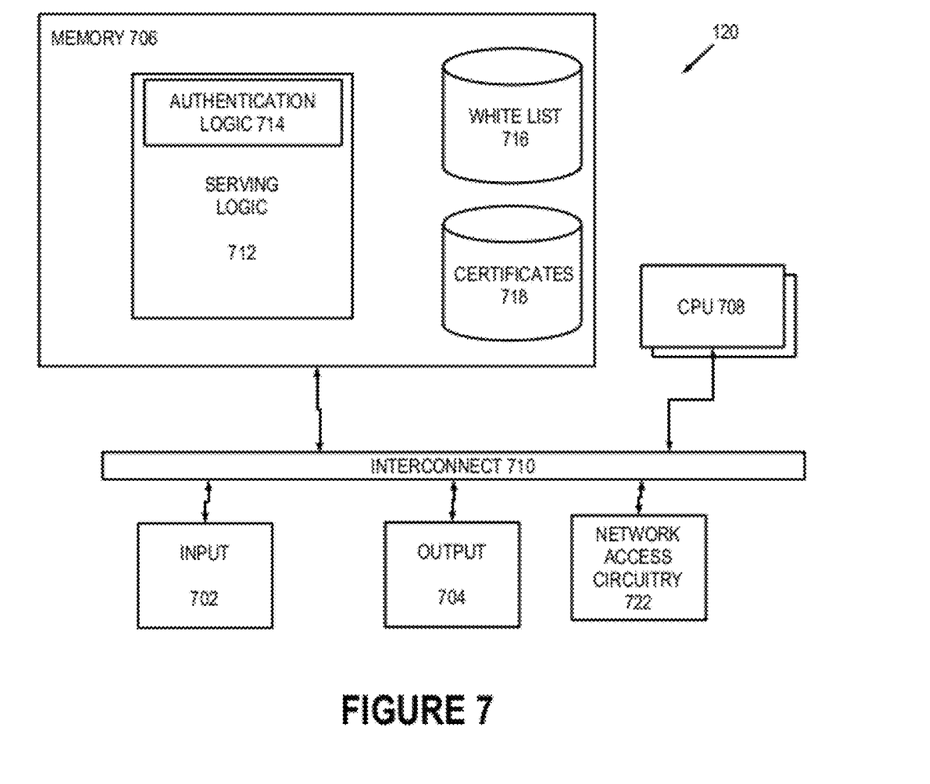
FIG. 7 is a block diagram showing the server of FIG. 1 in greater detail.

Server computer 120 includes a CPU 708, memory 706, interconnect 710, input devices 702, output devices 704, and network access circuitry 722 that are directly analogous to CPU 408 (FIG. 4), memory 406, interconnect 410, input devices 402, output devices 404, and network access circuitry 422, respectively, of DBCA 108.

A number of components of server computer 120 are stored in memory 706. In particular, serving logic 712 is all or part of one or more computer processes executing within CPU 708 from memory 706 in this illustrative embodiment but can also be implemented using digital logic circuitry. Serving logic 712 provides the server functionality designed into server computer 120 and includes authentication logic 714 that implements the authentication illustrated in transaction flow diagram 600 (FIG. 6). White list 716 and certificates 718 are data stored persistently in memory 706. In this illustrative embodiment, white list 716 and certificates 718 are each organized as a database.

White list 716 identifies all devices with which server computer 120 is permitted to grant access to one or more categories of secure content, i.e., content to which access is to be limited. Alternatively, white list 716 can identify all devices for which server computer 120 is permitted to offer various services. In this illustrative embodiment, white list 716 is generally of the same structure as digital fingerprint registry 414 (FIG. 4). Certificates 718 (FIG. 7) are generally of the same structure as certificates 416 (FIG. 4).

In step 602 (FIG. 6), client computer 102 requests access to secure content within server computer 120. Client computer 102 includes its identifier and digital fingerprint that were used in registration with DBCA 108 in the request.

In response to the request and in step 604 (FIG. 6), server computer 120 retrieves a certificate that is bound to client computer 102 from DBCA 108 in the manner illustrated in transaction flow diagram 200 (FIG. 2). In an alternative embodiment, client computer 102 can omit its identifier and digital fingerprint in the request of step 602 (FIG. 6) and DBCA 108 can cause client computer 102 to generate its digital fingerprint in the manner described above in conjunction with transaction flow diagram 200 (FIG. 2).

In step 606 (FIG. 6), server computer 120 compares the digital fingerprint in the certificate received from DBCA 108 in step 604 to the digital fingerprint received from client computer 102 in step 602. If the digital fingerprints match, server computer 120 grants the request for access to secure content within client computer 102. Conversely, if the digital fingerprints don't match, server computer 120 refuses the request and no access to secure content within client computer 120 is granted.

In this manner, server computer 120 leverages from the trustworthiness of DBCA 108 and its registration process to implement device-bound two-factor authentication.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

The reference to any prior art in this specification is not, and should not be taken as, an acknowledgement of any form of suggestion that such prior art forms part of the common general knowledge.

It will be understood that the term "comprise" and any of its derivatives (e.g.

comprises, comprising) as used in this specification is to be taken to be inclusive of features to which it refers, and is not meant to exclude the presence of any additional features unless otherwise stated or implied.

What is claimed is:

1. A method for binding a digital certificate that can be stored on a computer-readable medium to multiple devices, the method comprising:
   receiving at a server computer a request from a remote device through a computer network wherein the request identifies the certificate and identifies each of devices by a device identifier created by the server computer, each device identifier being uniquely associated with a digital fingerprint of one of the devices;
   retrieving the certificate;
   for each of the devices:
      retrieving a digital fingerprint of the device; and
      including the digital fingerprint in the certificate; and
      sending the certificate with the included digital fingerprints to the remote device through the computer network,
   wherein the server computer in response to the request serves a device driver cryptographically signed with the certificate so that any of the devices can install the device only upon a condition in which one of the digital fingerprints corresponds to the installing device.

2. The method of claim 1 wherein the remote device determines whether any of the digital fingerprints that are included in the certificate corresponds to the remote device and, upon a condition in which at least one of the digital fingerprint fingerprints corresponds to the remote device, accepts the certificate as legitimate.

3. The method of claim 2 wherein the remote device determines whether any of the digital fingerprints that are included in the certificate corresponds to a requesting device from which the remote device has received a request for access to secure content of the remote device and, upon a condition in which at least one of the digital fingerprints corresponds to the requesting device and the remote device is preconfigured to recognize the requesting device as authorized to access the secure content, grants the request.

4. The method of claim 1 wherein the remote device determines whether any of the digital fingerprints that are included in the certificate corresponds to a requesting device from which the remote device has received a request for access to secure content of the remote device and, upon a condition in which at least one of the digital fingerprints corresponds to the requesting device and the remote device is preconfigured to recognize the requesting device as authorized to access the secure content, grants the request.

5. The method of claim 1 wherein the remote device determines whether any of the digital fingerprints that is are included in the certificate corresponds to a requesting device from which the remote device has received a request for access to secure content of the remote device and, upon a condition in which at least one of the digital fingerprint fingerprints corresponds to the requesting device and the remote device is preconfigured to recognize the requesting device as authorized to access the secure content, grants the request.

6. A non-transitory computer readable medium useful in association with a computer which includes one or more processors and a memory, the computer readable medium including computer instructions which are configured to cause the computer, by execution of the computer instructions in the one or more processors from the memory, to bind a digital certificate that can be stored on a computer readable medium to multiple devices by at least:

receiving at the computer a request from a remote device through a computer network wherein the request identifies the certificate and identifies each of the devices by a device identifier created by the server computer, each device identifier being uniquely associated with a digital fingerprint of one of the devices;

retrieving the certificate;

for each of the one or more devices:

retrieving a digital fingerprint of the device; and including the digital fingerprint in the certificate; and sending the certificate with the one or more included digital fingerprints to the remote device through the computer network, wherein the server computer in response to the request serves a device driver cryptographically signed with the certificate so that any of the devices can install the device only upon a condition in which one of the digital fingerprints corresponds to the installing device.

* * * * *

UNITED STATES PATENT AND TRADEMARK OFFICE
CERTIFICATE OF CORRECTION

PATENT NO. : 8,438,394 B2
APPLICATION NO. : 13/179387
DATED : May 7, 2013
INVENTOR(S) : Craig S. Etchegoyen and Dono Harjanto Page 1 of 1

It is certified that error appears in the above-identified patent and that said Letters Patent is hereby corrected as shown below:

In the Claims, Column 8, correct Claim 1 at line 27 as follows:

identifies the certificate and identifies each of -- the -- devices by

Signed and Sealed this
Fourth Day of June, 2013

Teresa Stanek Rea
*Acting Director of the United States Patent and Trademark Office*